UNITED STATES PATENT OFFICE.

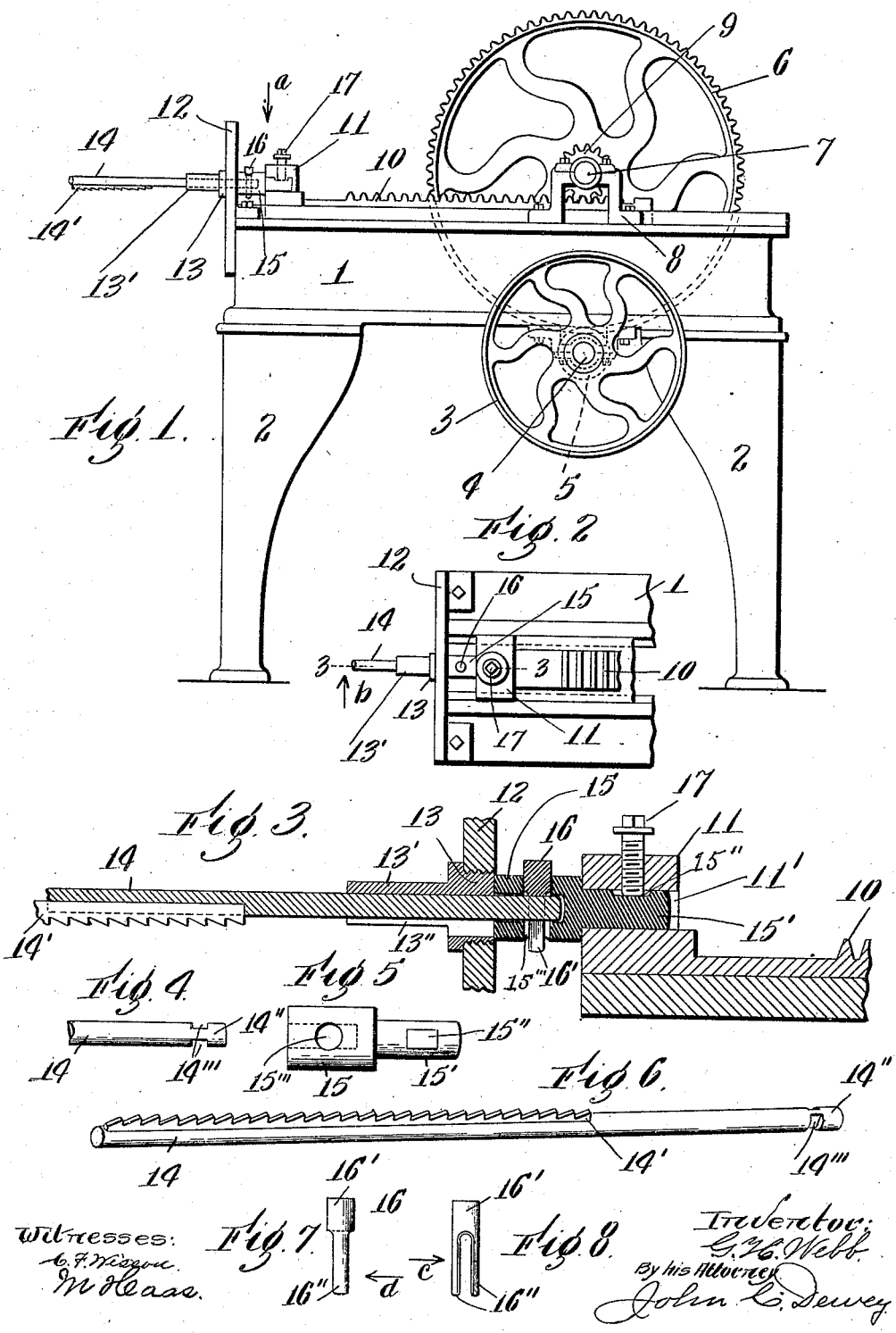

GEORGE H. WEBB, OF PAWTUCKET, RHODE ISLAND.

MACHINE FOR FORMING KEY-SEATS IN HUBS OF GEARS, &c.

No. 823,833.        Specification of Letters Patent.        Patented June 19, 1906.

Application filed February 3, 1905. Serial No. 243,938.

*To all whom it may concern:*

Be it known that I, GEORGE H. WEBB, a citizen of the United States, residing at Pawtucket, in the county of Providence and State of Rhode Island, have invented certain new and useful Improvements in Machines for Forming Key-Seats in Hubs of Gears, &c., of which the following is a specification.

My invention relates to a key-seating machine or a machine for cutting key-seats in the hubs of gears, &c., and more particularly to improvements on the key-seating machine shown and described in United States Letters Patent No. 275,393. In the practical use of said patented machine a set of removable bushings carrying quills for supporting the hubs to be key-seated and a set of cutter-bars are furnished with each machine, so that key-seats may be cut in hubs having holes therethrough of different diameters. In order to get the best results from the teeth on the cutter-bar and to properly cut the key-seat in the hub with one movement of the cutter-bar through the hub, it is necessary to have on the cutter-bars of fixed length as many teeth as possible for the cutting-surface, which extend on the under side of the bar from the extreme outer end nearly to the inner end, which is detachably secured in an opening in a block integral with or fast on one end of a reciprocating rack. If a machine has a set of bushings carrying quills and cutter-bars adapted to key-seat hubs six inches long, the quill will be six inches long and the cutter-bar will be without teeth for six inches beyond the end of the quill, making twelve inches. Now if it is desired to key-seat a hub of any other size—as, for instance, one seven and a half inches long—on this machine it will be necessary to remove the cutter-bar and place the hub on the quill and then replace the cutter-bar. As the block to which the cutter-bars are attached is permanently secured to the reciprocating rack and the opening therein for the inner end of the cutter-bars is of fixed size, it is necessary that the inner ends of the different cutter-bars for different sizes of openings in the different hubs should be of uniform size to fit the opening in said block. In case of large cutter-bars the inner end is of reduced diameter, and in the case of small cutter-bars the inner end is of enlarged diameter to fit the opening in the block on the rack. In the case of a
small cutter-bar for key-seating hubs with small openings and having an enlarged inner end to fit the opening in the block on the rack if it is desired to key-seat a hub which is too long to be passed over the outer toothed end of the bar and properly positioned on the supporting-quill, as above described, the enlarged diameter of the inner end of said bar will prevent said end from being inserted through the quill supporting the hub or through the hub when the cutter-bar is replaced, as above described, and consequently said longer hub cannot be key-seated by the small cutter-bar on said machine.

The object of my invention is to provide for the key-seating of longer hubs with small openings therethrough by a small cutter-bar on the same machine as said small cutter-bar is used for key-seating shorter hubs without changing or varying the size of the opening in the block on the reciprocating rack.

In carrying out my invention I provide an auxiliary block for the inner end of the small cutter-bars, which is adapted to be readily attached to or detached from the ordinary block on the rack, to which the inner ends of the cutter-bars are attached.

My auxiliary block is intended to be used only when a small cutter-bar is used for small openings in long hubs and when the cutter-bar has to be removed to place the hub to be key-seated on the supporting-quill or on the cutter-bar itself from its inner end.

The inner end of the small cutter-bar may be of the same diameter as the rest of the smooth part of the cutter-bar, or it may be of less diameter, the diameter thereof corresponding substantially with the size of the opening in the auxiliary block, adapted to be attached to the regular block on the reciprocating rack.

My auxiliary block has one end preferably of reduced size, which end extends into the opening in the regular block on the rack and is detachably secured therein by a set-screw or bolt which extends at its inner end into a recessed portion in said rod. The other end of my auxiliary block has an opening therein to receive the inner end of the small cutter-bar, the size of said opening corresponding to the diameter of the inner end of said bar. There is also a vertically-extending opening through said auxiliary block, bisecting the other opening to receive a removable pin, which preferably has a bifurcated or forked inner end adapted to fit onto the inner end of the cutter-bar and enter recesses on opposite sides thereof to attach the bar to the auxiliary block, all as will be hereinafter described.

I have shown in the drawings a machine corresponding to the machine shown in said Letters Patent No. 275,393 with my improvements applied thereto.

Referring to the drawings, Figure 1 is a side view of a machine of the class referred to embodying my improvements. Fig. 2 is a detached plan view of the parts shown at the left in Fig. 1 looking in the direction of arrow $a$, same figure. Fig. 3 is a section on line 3 3, Fig. 2, looking in the direction of arrow $b$, same figure. Fig. 4 is a plan view of the inner end of a small cutter-bar detached. Fig. 5 is a plan view of my auxiliary block detached. Fig. 6 is a perspective view of the under side of a small cutter-bar detached. Fig. 7 shows the attaching-pin detached looking in the direction of arrow $c$, Fig. 8; and Fig. 8 shows the pin shown in Fig. 7 looking in the direction of arrow $d$, same figure. Figs. 3 to 8, inclusive, are on an enlarged scale.

In the accompanying drawings, 1 is the bed of the machine, supported on legs 2.

3 is a belt-pulley driven by a belt (not shown) and mounted on a shaft 4.

A pinion 5 (indicated by broken lines) meshes with and drives a gear 6, fast on a shaft 7, mounted in bearings 8 on the bed 1. Also fast on the shaft 7 is a pinion 9, meshing with and operating a rack 10, mounted and having a reciprocating motion in guideways on the upper side of the bed 1. On the front end of the rack-bar 10 is a block 11, in this instance integral with said rack and having a horizontal opening 11′ therethrough. An upright stand or plate 12 is secured on one end of the bed 1 and has in this instance a threaded opening therethrough to receive the threaded end of a bushing 13, having a quill 13′ thereon for supporting the hub of the gear or other device to be operated on. The quill 13′ is preferably eccentric in cross-section and has a longitudinal opening 13″ through its lower part to permit of the reciprocating movement of the cutter-bar 14. The cutter-bar 14 has the cutting-teeth 14′, preferably secured in a longitudinal groove or recess in the under side of the bar, with the external line of the teeth tapering slightly outwardly. The inner end of the cutter-bar 14 has no teeth thereon.

All of the above parts may be of the ordinary and well-known construction as shown and described in said Patent No. 275,393.

I will now describe my improvements.

I provide an auxiliary block 15, preferably having a reduced end 15′ adapted to extend into the opening 11′ in the block 11 and to be secured therein by a set-screw or bolt 17, which turns in a threaded hole in said block 11 and in this instance extends at its inner end into a recess 15″ in the upper side of the end 15′. The auxiliary block 15 has a horizontally-extending opening therein adapted to receive loosely the inner end 14″ of the cutter-bar 14. Said end 14″ has preferably, on opposite sides thereof, notches or recesses 14‴. Extending vertically through the auxiliary block 15 is an opening 15‴, which extends at right angles to and passes through the other opening. (See Fig. 3.) A pin 16, preferably having one end 16′ enlarged and forming a head or engaging surface and its other end slotted or bifurcated to form two parallel parts 16″, is adapted to be removably inserted into the vertical opening 15‴ through the block 15. The two parts 16″ of said pin enter the recesses 14‴ in the inner end 14″ of the cutter-bar 14.

By means of the detachable pin 16 the cutter-bar 14 is detachably connected to the auxiliary block 15, which is secured to the block 11 on the reciprocating moving rack-bar 10.

In order to detach the cutter-bar 14 and remove it from the machine preparatory to key-seating a long hub or other device, it is only necessary to remove the pin 16 and after the hub or other device is placed on the quill 13′ to replace the cutter-bar 14 and secure the inner end 14″ thereof in the block 15 by inserting the pin 16.

The advantages of my improvements will be readily appreciated by those skilled in the art. My auxiliary block 15 may be used on any machine of the class referred to. In key-seating or operating on hubs or other devices with small openings therethrough, where it is necessary to use a small cutter-bar and to remove the cutter-bar at every operation by reason of the length of the hub preventing it from being passed over the cutter-bar and positioned on the quill the cutter-bar may be quickly and easily removed by simply withdrawing the pin 16 and be replaced and secured in the machine by inserting said pin 16.

It will be understood that the details of construction of my improvements may be varied, if desired, and they may be adapted to be applied to any machine for cutting key-seats or for forming recesses in different devices or for broaching.

Having thus described my invention, what I claim as new, and desire to secure by Letters Patent, is—

1. In a machine of the class described, the combination with a reciprocating rack having a block permanently connected thereto, said block being provided with the usual opening adapted to receive the end of a cutter-bar, of an auxiliary block having a part adapted to fit the usual cutter-bar opening in said permanently-connected block, and means for connecting the end of a cutter-bar to said auxiliary block whereby cutter-bars may be secured directly to the permanently-connected block or to the auxiliary block.

2. In a machine of the class described, the combination with a reciprocating rack having a permanent block, said block having the usual opening for securing a cutter-bar therein, an auxiliary block adapted to be secured in the usual cutter-bar opening of the permanent block, said auxiliary block having a cutter-bar opening of different size than the corresponding opening of the permanent block, and means for securing a cutter-bar in the opening of the auxiliary block.

3. In a machine of the class described, the combination of a reciprocating rack, a permanent block and an auxiliary block, each provided with means for securing cutter-bars thereto, and means for detachably connecting the auxiliary block to the permanent block so that cutter-bars may be connected directly to the permanent block, or indirectly thereto by means of the auxiliary block.

4. In a machine of the class described, the combination of a reciprocating rack, a block permanently secured thereto and having the usual tool-opening for securing a cutter-bar therein, an auxiliary block having a reduced end to fit the usual tool-opening in the permanent block, the other end of said auxiliary block having a horizontal opening to receive the end of the cutter-bar, and another opening at right angles thereto, and a removable bifurcated pin fitted in said last-named opening and engaging opposite sides of the cutter-bar.

GEORGE H. WEBB.

Witnesses:
   ALBERT E. HACKING,
   EDWIN HARRIS.